United States Patent
Höppner et al.

(10) Patent No.: US 10,777,235 B2
(45) Date of Patent: Sep. 15, 2020

(54) APPARATUS AND METHOD FOR GENERATION AND ADAPTIVE REGULATION OF CONTROL VOLTAGES IN INTEGRATED CIRCUITS WITH BODY BIASING OR BACK-BIASING

(71) Applicant: RACYICS GMBH, Dresden (DE)

(72) Inventors: Sebastian Höppner, Dresden (DE); Jörg Schreiter, Markkleeberg (DE); Stephan Henker, Nossen (DE); André Scharfe, Bannewitz (DE)

(73) Assignee: RACYICS GMBH, Dresden (DE)

( * ) Notice: Subject to any disclaimer, the term of this patent is extended or adjusted under 35 U.S.C. 154(b) by 0 days.

(21) Appl. No.: 16/633,291

(22) PCT Filed: May 17, 2018

(86) PCT No.: PCT/EP2018/062851
§ 371 (c)(1),
(2) Date: Jan. 23, 2020

(87) PCT Pub. No.: WO2019/025047
PCT Pub. Date: Feb. 7, 2019

(65) Prior Publication Data
US 2020/0150180 A1      May 14, 2020

(30) Foreign Application Priority Data

Aug. 4, 2017    (DE) .................... 10 2017 117 745
Aug. 4, 2017    (DE) .................... 10 2017 117 772
(Continued)

(51) Int. Cl.
*G11C 5/14*        (2006.01)
*G01R 31/317*     (2006.01)
*G05F 3/20*        (2006.01)
*G06F 11/30*      (2006.01)
(Continued)

(52) U.S. Cl.
CPC ........ *G11C 5/146* (2013.01); *G01R 31/31712* (2013.01); *G01R 31/31725* (2013.01);
(Continued)

(58) Field of Classification Search
CPC ........ G01R 31/31712; G01R 31/31725; G05F 3/205; G06F 11/3013; G06F 11/3423; G11C 5/146
(Continued)

(56) References Cited

U.S. PATENT DOCUMENTS 6,002,355 A * 12/1999 Del Signore ........... H03M 1/12
                                                        327/534
8,112,754 B2    2/2012    Shikano
(Continued)

OTHER PUBLICATIONS

International Report on Patentability and Written Opinion issued in PCT/EP20181062851 and dated Feb. 13, 2020.
(Continued)

*Primary Examiner* — William Hernandez
(74) *Attorney, Agent, or Firm* — Heslin Rothenberg Farley and Mesiti PC; Nicholas Mesiti

(57) ABSTRACT

An apparatus and a method for generation and adaptive regulation of body bias voltages of an integrated circuit efficiently generates control voltages for active body biasing The apparatus includes a digital circuit, a counter, a control unit and at least one charge pump. The control unit and the digital circuit are connected in a closed control loop, and the digital circuit comprises at least one hardware performance monitor to monitor a timing of a body bias voltage. The control loop is formed by a control path comprising the at least one charge pump, the hardware performance monitor and the control unit. The charge pump is controllably connected to the control unit to adjust the charge pump for generation and adaptive regulation of the body bias voltage
(Continued)

Closed Loop Body Bias Regulation System according to a timing frequency difference between an output signal of the hardware performance monitor and a reference clock signal.

20 Claims, 6 Drawing Sheets

(30) Foreign Application Priority Data

Aug. 22, 2017 (DE) .......... 10 2017 119 111
Oct. 27, 2017 (DE) .......... 10 2017 125 203

(51) Int. Cl.
*G06F 11/34* (2006.01)
(52) U.S. Cl.
CPC .......... *G05F 3/205* (2013.01); *G06F 11/3013* (2013.01); *G06F 11/3423* (2013.01)
(58) Field of Classification Search
USPC ................................. 327/534, 535, 536, 538
See application file for complete search history.

(56) References Cited

U.S. PATENT DOCUMENTS

| | | |
|---|---|---|
| 8,816,754 B1 | 8/2014 | Clark et al. |
| 8,970,289 B1 | 3/2015 | Lee et al. |
| 2001/0017566 A1* | 8/2001 | Nakahara ................ H02M 3/07 327/536 |
| 2017/0123444 A1 | 5/2017 | Tseng et al. |

OTHER PUBLICATIONS

International Search Report and Written Opinion issued in PCT/EP2018/062851 and dated Aug. 21, 2018.

Guerric de Streel et al., "Impact of Back Gate Biasing Schemes on Energy and Robustness of ULV Logic in 28nm UTBB FDSOI Technology", Proc. IEEE Int. Symp. Low Power Electron Design (ISLPED), Sep. 2013, pp. 255-260.

R. Carter, "22nm FDSOI technology for emerging mobile, Internet-of-Things, and RF applications", 2016 IEEE International Electron Devices Meeting (IEDM), San Francisco, CA, Dec. 2016, pp. 2.2.1-2.2.4.

Joan Mauricio et al., "Local Variations Compensation with DLL-based Body Bias Generator for UTBB FD-SOI Technology", 13th International New Circuits and Systems Conference, 2015 IEEE, ISBN: 978-1-4799-8893-8.

Milovan Blagojevic et al., "A Fast, Flexible, Positive and Negative Adaptive Body-Bias Generator in 28nm FDSOI", 2016 IEEE Symposium on VLSI Circuits, Digest of Technical Papers, pp. 60-61.

* cited by examiner

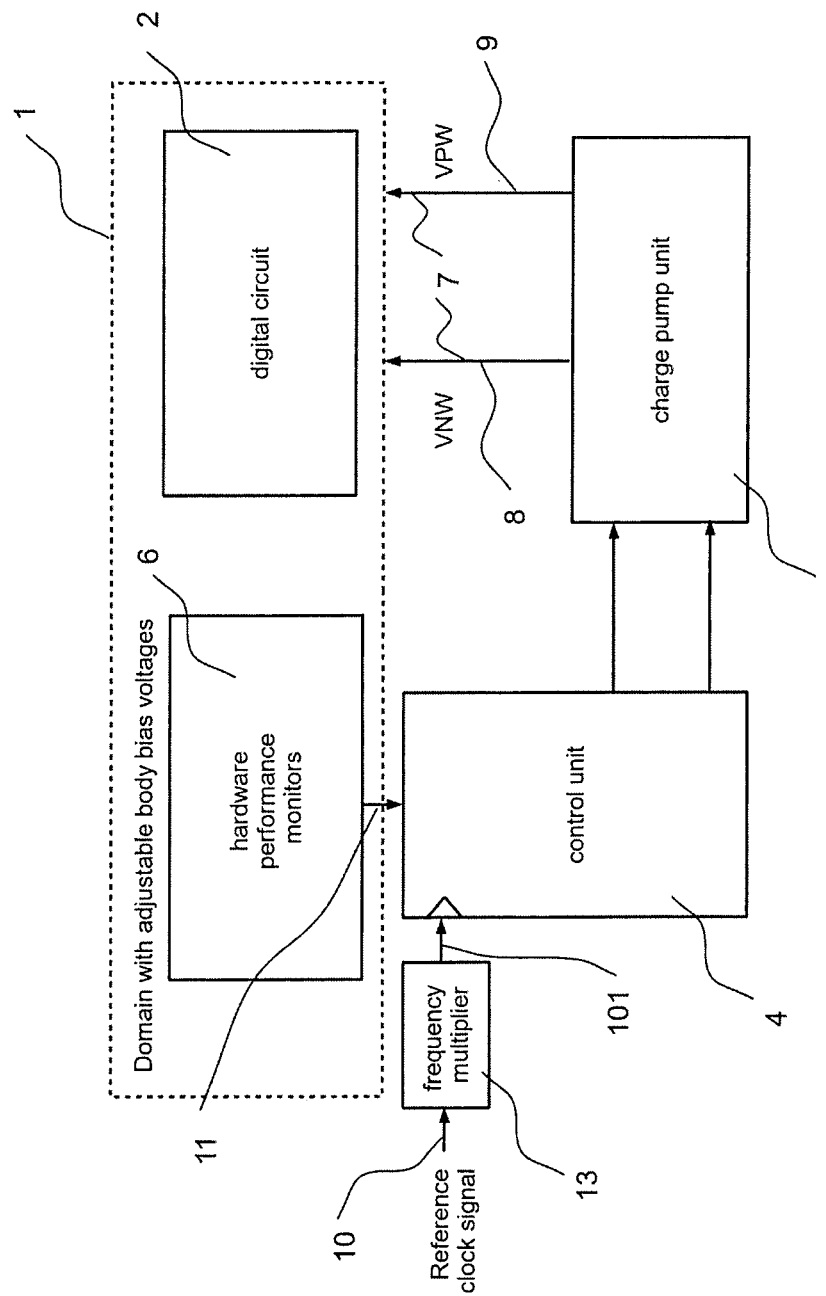
Fig. 1 Closed Loop Body Bias Regulation System

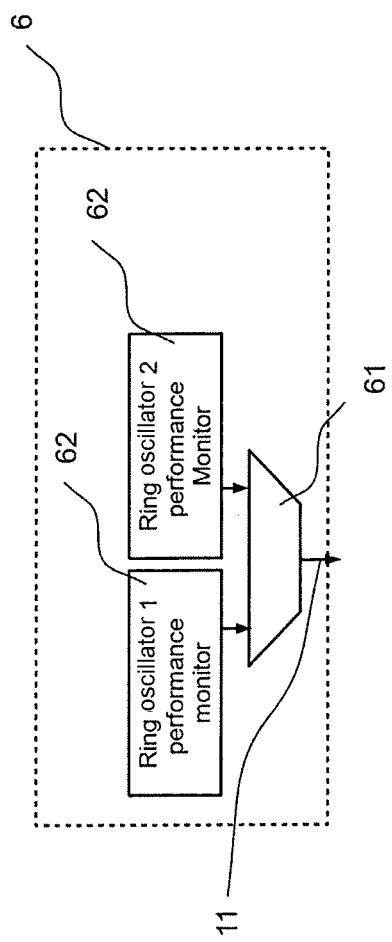
Fig. 2 Hardware Performance Monitors

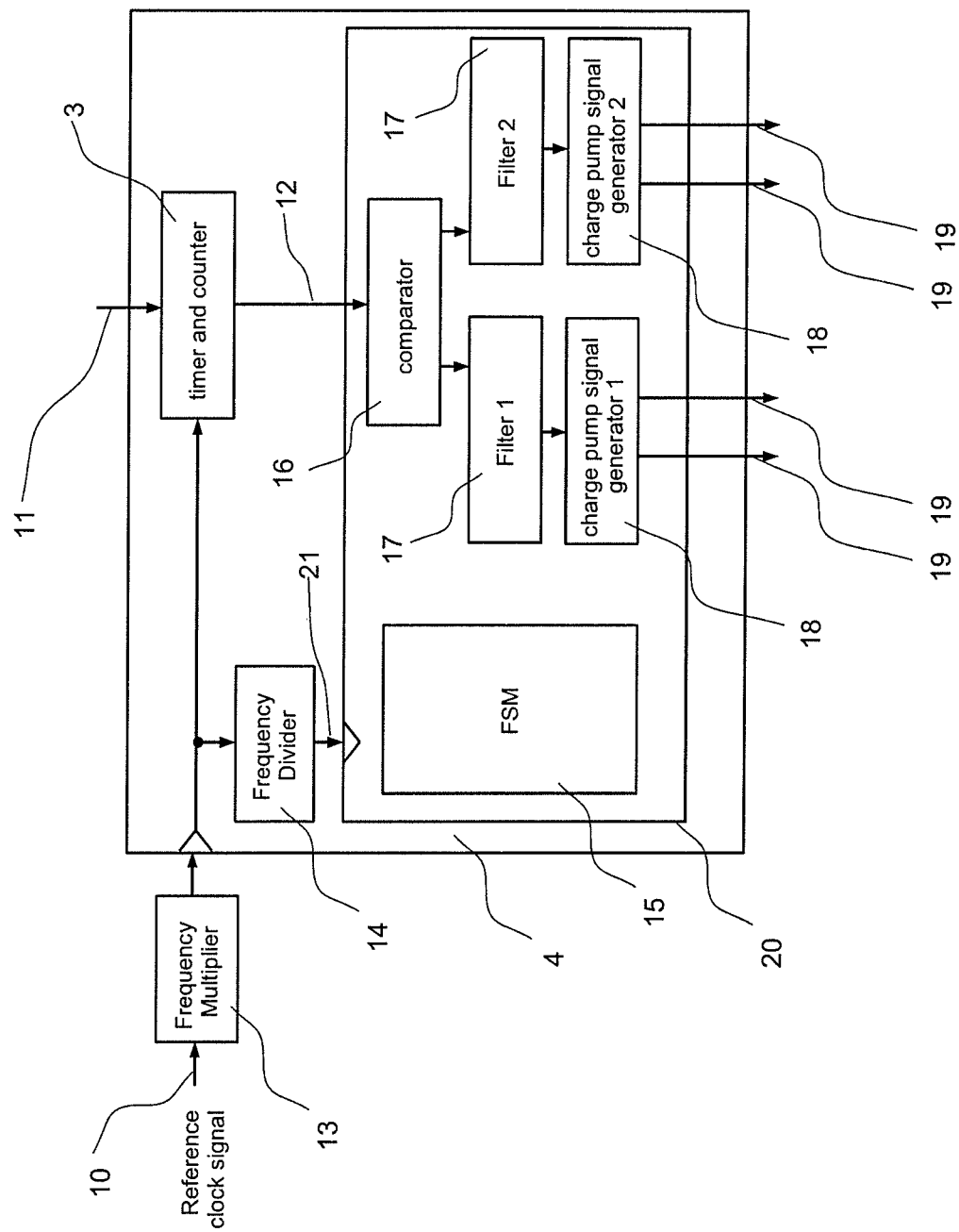
Fig. 3a Control Unit

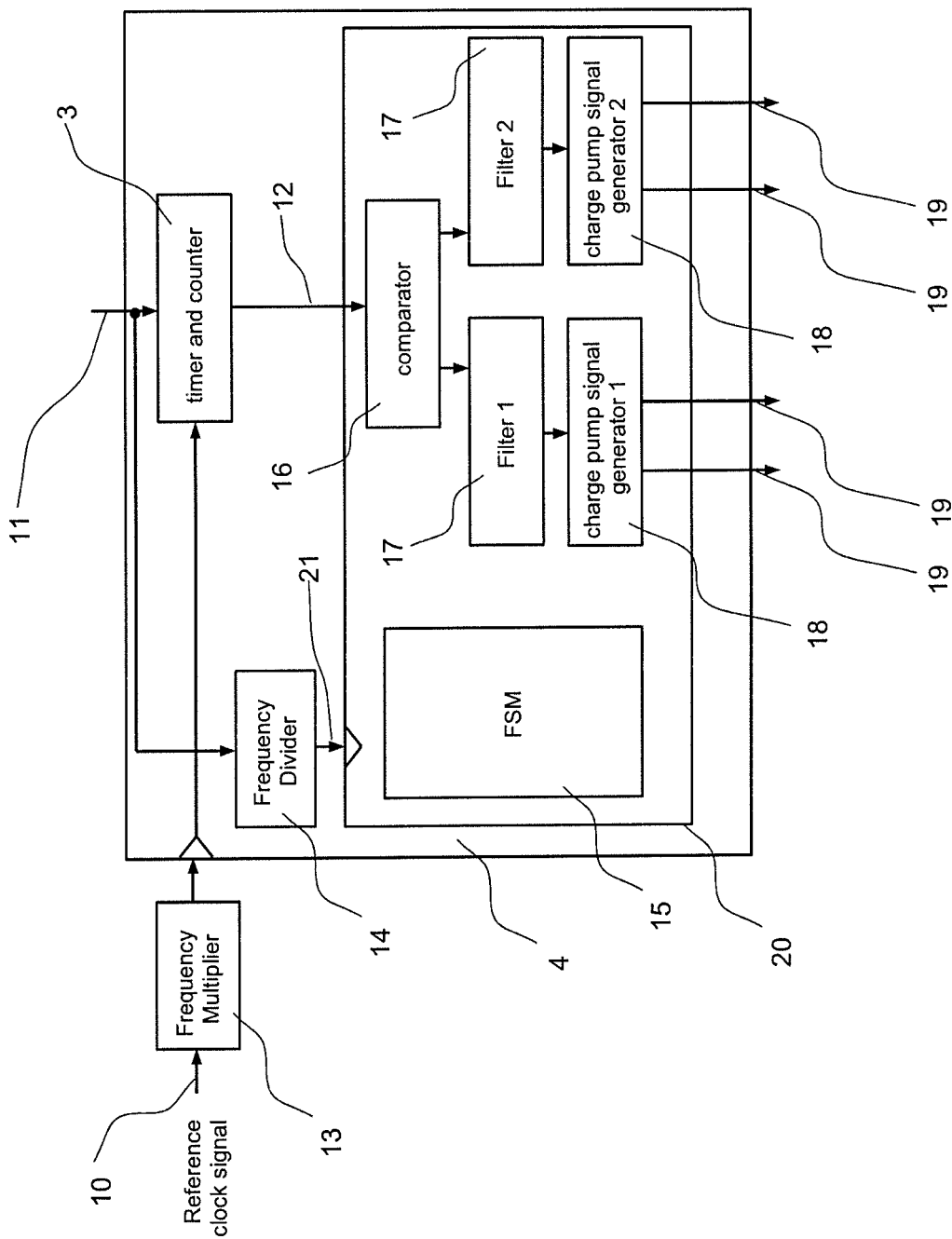
Fig. 3b Control Unit Using HPM signal as clock

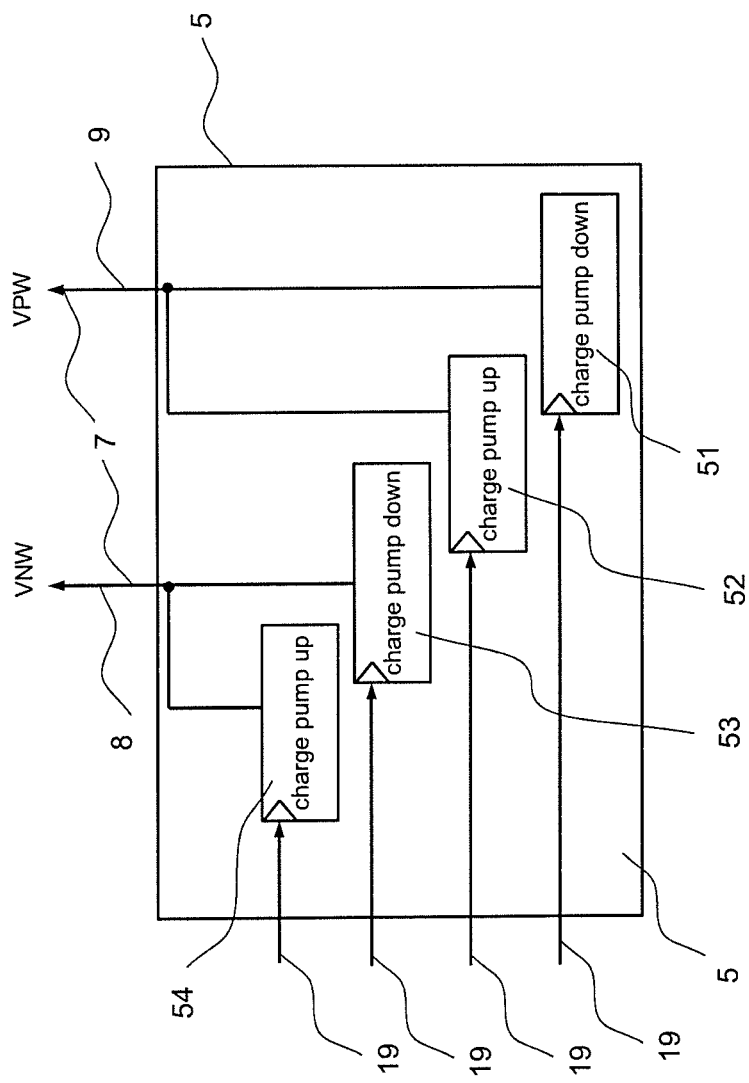
Fig. 4 Charge Pump Unit

Fig. 5 Control Flow Example
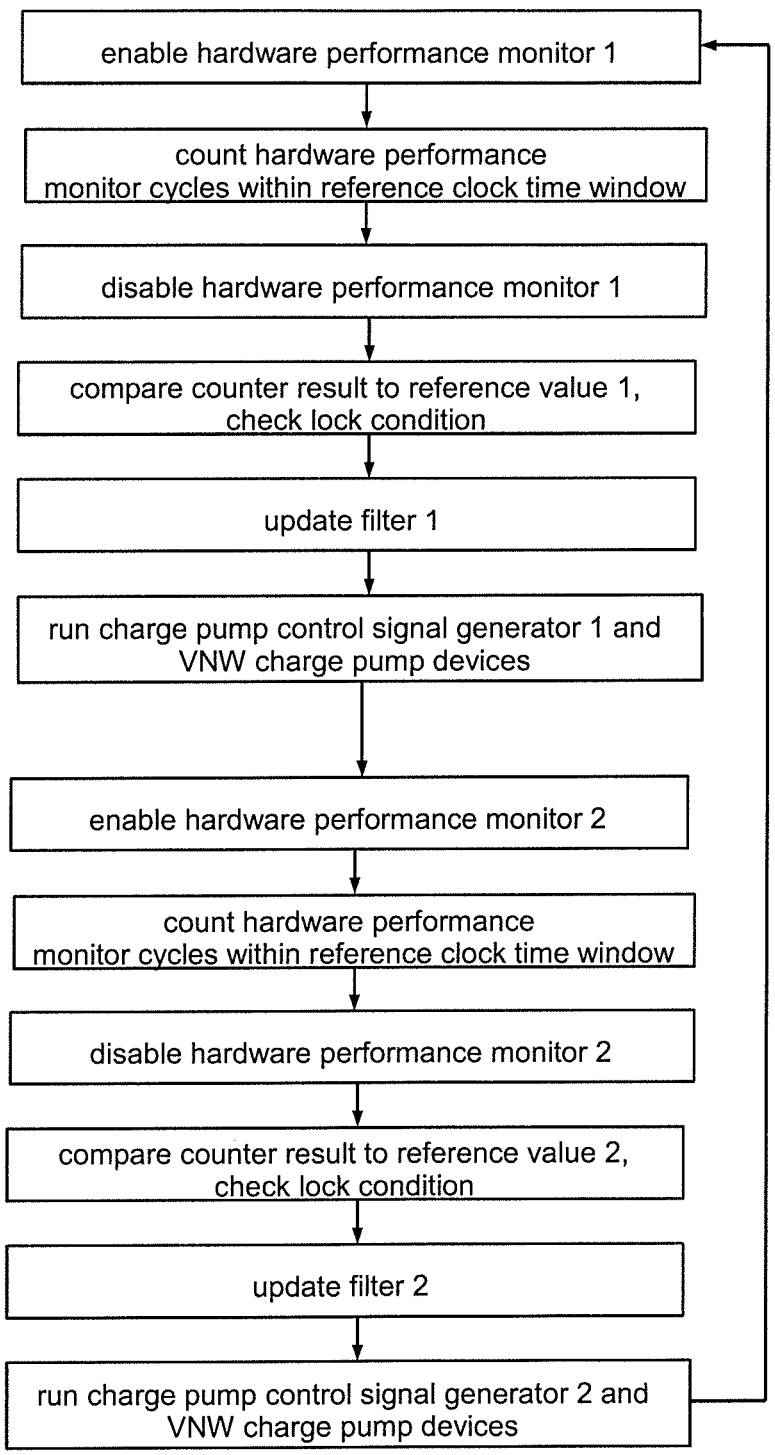

APPARATUS AND METHOD FOR GENERATION AND ADAPTIVE REGULATION OF CONTROL VOLTAGES IN INTEGRATED CIRCUITS WITH BODY BIASING OR BACK-BIASING

CROSS REFERENCE TO RELATED APPLICATIONS

This application is the National Phase filing under 35 U.S.C. § 371 of International Application No. PCT/EP2018/062851, filed on May 17, 2018, and published on Feb. 7, 2019 as WO 2019/025047 A1, which claims priority to German Application No. 102017117772.8, filed on Aug. 4, 2017, and German Application No. 102017117745.0, filed on Aug. 4, 2017, and German Application No. 102017119111.9, filed on Aug. 22, 2017, and German Application No. 102017125203.7, filed Oct. 27, 2017. The contents of each of the prior applications are hereby incorporated by reference herein in their entirety.

The invention relates to an apparatus and a method for generation and adaptive regulation of body bias voltages of an integrated circuit.

BACKGROUND

Background of the invention is the generation, adjustment and control of body bias voltages in silicon-on-insulator (SOI) CMOS technologies. An overview of the Silicon-on-Insulator (SOI) CMOS technologies is exemplary published in R. Carter et al., "22 nm FDSOI technology for emerging mobile, Internet-of-Things, and RF applications," 2016 IEEE International Electron Devices Meeting (IEDM), San Francisco, Calif., 2016, pp. 2.2.1-2.2.4. doi: 10.1109/IEDM.2016.7838029. These technologies allow the threshold voltages of transistors to be adjusted by applying a body bias voltage or back-gate voltage. An investigation of the impact of back gate biasing schemes on energy and robustness can be found in G. de Streel and D. Bol, "Impact of back gate biasing schemes on energy and robustness of ULV logic in 28 nm UTBB FDSOI technology," in Proc. IEEE Int. Symp. Low Power Electron. Design (ISLPED), September 2013, pp. 255-260.

Fully depleted silicon-on-insulator (FD-SOI) CMOS technologies allow the adaptation of the threshold voltages of transistors by adjusting one or more bias voltages. These bias voltages are typically applied through regions below the SOI isolation layer, sometimes called "back gates". The scheme is known as back biasing. To an extent, a similar control of transistors' threshold voltages through biasing can be done in conventional SOI and bulk CMOS technologies, and is then also referred to as "body biasing".

Adaptation of the threshold voltages through biasing can be done during operation of the circuit, in order to compensate variations in the fabrication process (P), of the supply voltage (V) and of the temperature (T), in an attempt to achieve a target delay time and/or target leakage current consumption. Adaptation of the threshold voltages through biasing is also a means to adjust an adaptive compromise between switching speed and leakage current consumption in order to adapt the circuit or system with regard to the performance requirement.

Hence, the adaptive back biasing (or body biasing) allows the system to adapt to changing requirements in terms of performance, operating speed, and current consumption. A multiprocessor system with a body bias control circuit can be found in U.S. Pat. No. 8,112,754 B2.

Typically, two different control voltages are used to independently control nmos transistors and pmos transistors. In general, the scheme applies to one or more control voltages.

These control voltages can be generated by charge pumps or by other controllable means. The problem is to control the voltage generation in a closed loop in such a way that the above-mentioned goals are achieved. The problem is complicated, because couplings exist between the different parts of the integrated circuit, which have to receive different control voltages. Any change in the control voltages requires a significant charge transport to the bias voltage network (e.g. implant wells). The time required for this depends on the capacitance of the control circuit powered parts of the integrated circuit. Therefore, it depends directly on the chip area of the circuit. And finally, hardware performance monitor circuits used to detect the effect of the control voltage require time for detection. A hardware performance monitor is a circuit that monitors certain parameters of certain circuit components and produces an according output signal. In a typical implementation, a hardware performance monitor can be realized as a ring oscillator, whose output signal frequency depends on the switching speed of specific logic elements. Such a hardware performance monitor can also be readout through a counter circuit, which then produces a digital output value that depends on the output signal frequency of the hardware performance monitor. For flexible use it is furthermore desirable that as little requirements are made with respect to the number and frequency of clock signals and other control signals of hardware performance monitors and corresponding read-out circuits. It is also desirable to use as little energy as possible for the generation of the control voltages, the regulation thereof and for the detection of the operating state of the controlled circuit.

Until now, hardware performance monitors in the form of delay lines are used in order to detect the effect of the control voltages. This is described in Joan Mauricio and Francesc Moll: "Local Variations Compensation with DLL-based Body Bias Generator for UTBB FD-SOI technology", 13th International New Circuits and Systems Conference (NEW-CAS), 2015 IEEE, ISBN: 978-1-4799-8893-8, whereas the control voltages are generated by charge pumps, which are controlled in a closed loop. The above-described solution has the disadvantage that it requires an external periodic reference signal whose pulse duration must be exactly matched to the desired target performance. The setting of the gain of the control loop must be set by the frequency of this external reference signal. The frequency of the reference signal therefore also depends on the area of the supplied circuit hence this solution is not very flexible.

In Milovan Blagojević et al. "A Fast, Flexible, Positive and Negative Adaptive Body-Bias Generator in 28 nm FDSOI", 2016 IEEE Symposium on VLSI Circuits, Digest of Technical Papers, pp. 60-61 also a charge pump is used. The generation of the control voltages is controlled in a closed loop. The gain in the control loop can be switched between only two values. The drawback is that the concrete values for the control voltages must be specified externally. The closed control loop then ensures that the externally specified voltage values are maintained within certain tolerances. The gain factor in the control loop must be switched between the two possible values by means of an external control signal.

It is therefore one object of the invention to efficiently generate and regulate the control voltages for active body biasing such that the parts of the integrated circuit supplied with said control voltages achieve set criteria with respect to certain parameters, such as performance, speed, power consumption or other parameters. The control voltages ay assume positive and negative values relative to the reference potential of the integrated circuit and can be a multiple of the operating voltage of the integrated circuit.

Furthermore, the only external reference signal should be a clock signal with a constant frequency, the constant frequency should be selectable within wide limits. Other reference signals, e.g. voltages, currents, or other properties of a clock signal, e.g. such as pulse-width or duty cycle should neither be used nor required.

Another object is that the generation and maintenance of the control voltages should be realized with the smallest possible power consumption.

SUMMARY OF THE INVENTION

The object of the invention will be solved by an apparatus for generation and adaptive regulation of body bias voltages of an integrated circuit comprising a digital circuit, a counter, a control unit and a charge pump unit, whereas the control unit and the digital circuit are connected in a closed control loop, and whereas the digital circuit comprises at least one hardware performance monitor, monitoring a timing of the digital circuit affected by a body bias voltage, and whereas the control loop is formed by a control path comprising the charge pump unit, the hardware performance monitor and the control unit, whereas the charge pump unit is controllably connected to the control unit adjusting the charge pump for generation and adaptive regulation of the body bias voltage according to a frequency difference between an output signal of the hardware performance monitor and a reference clock signal.

The integrated circuit comprises a digital circuit, wherein threshold voltages of transistors in the digital circuit can be adjusted by applying a body bias voltage or back-gate voltage. The body bias voltages are generated by one or several charge pumps comprised in the charge pump unit.

It is advantageous, that the charge pumps are controlled by a closed loop regulation as a means to ensure the effect of the bias voltage or bias voltages generated by the charge pump unit matches a set target.

The electrical properties of the charge pump unit together with the electrical properties of the part(s) of the integrated circuit to be supplied with the body bias voltage(s) result in a specific time behavior. This time behavior can be described by a characteristic time constant or its reciprocal, as a characteristic frequency. This characteristic frequency can determine the dominant pole of the control loop to maintain stability of the control loop.

In a preferred embodiment of the inventive apparatus, the charge pump unit comprises four charge pumps for generating two active body bias voltages, one charge pump for respectively increasing or decreasing one of the two said body bias voltages. This has the advantage that the body bias voltages can be actively increases and decreases, which is faster than an active change in only one direction and a passive relaxation in the other direction. Thereby, the closed loop regulation can quickly react on a performance change, as monitored by the hardware performance monitor, and actively increase or decrease the bias voltages for nmos and pmos devices in the circuit.

In another preferred embodiment of the inventive apparatus, the charge pump unit comprises a single-stage charge pump for increasing and a single-stage charge pump for decreasing the body bias voltage within a working range with predominantly positive voltage; and a single-stage charge pump for increasing and a two-stage charge pump for decreasing the body bias voltage within a working range with predominantly negative voltage. This has the positive effect, that the bias voltage can be actively increased or decreased by the closed loop regulator, independent from the bias well leakage currents.

In a further preferred embodiment of the inventive apparatus, the closed loop control unit is a digital controller. A digital controller has the advantage of being able to directly process the digital output of a counter based hardware performance monitor readout, and generate a charge pump control signal, e.g. a sequence of clock pulses. It further can contain a digital filter, which can ensure the stability of the closed control loop.

The timing of logic circuits which are biased by the body bias voltages is monitored by at least one hardware performance monitor. In a preferred embodiment of the inventive apparatus the at least one hardware performance monitor monitors the timing of logic circuits which are biased by the body bias voltage(s) and indicates a required adaption of the body bias voltage towards an optimum value for a target performance of the integrated circuit. Thus, a signal from the hardware performance monitor or hardware performance monitors indicates whether the body bias voltage should be lowered or increased to approach a set target of the timing of the logic circuits. It is not necessary to know the concrete value of the body bias voltage. Therefore, the adaptive regulation is not limited to the resolution or accuracy of any tuning mechanism and it does not depend on pre-defined values.

In a preferred embodiment, the hardware performance monitor comprises at least one oscillator. The oscillator detects the specific time behavior of the part of the integrated circuit to be supplied with the body bias voltages and which can be described as a characteristic frequency.

In a further preferred embodiment, the counter is connected to the output of the hardware performance monitor and a reference clock signal source. The counter registers a counter value by measuring the characteristic frequency of the oscillator of the hardware performance monitor relative to the frequency of a reference clock signal.

In a further preferred embodiment, a comparator compares this counter value with a reference value. It further calculates the difference of both values and feeds the difference to a digital filter. A lock condition of the closed loop regulation is checked by comparing the magnitude of the difference value to a specified lock criterion value. The closed loop is considered to be locked when the magnitude of this difference value is smaller than the specified lock criterion value.

Because closed loop regulation is used, the frequency of the oscillator of the hardware performance monitor is well controlled, and hence it is possible to use the oscillator signal of the hardware performance monitor as a clock signal for the control unit and for the charge pump unit or the charge pumps. This has the advantages that no separate controller clock signal is required and that a high speed clock signal is available for charge pump signal generation in case only a low frequency reference clock signal is available. So, in a further embodiment of the inventive apparatus, a frequency multiplier circuit is connected to the reference clock signal source and to an output signal of the hardware performance monitor. The output of the frequency multiplier is then used as a clock signal for the control unit and the charge pump unit.

In another preferred embodiment of the inventive apparatus, a gain of the closed control loop is changeable by changing the operation frequency of the charge pump unit by means of a programmable frequency divider and/or by changing a number of charge pumps within the charge pump unit. This results in a larger or smaller amount of charge to be pumped in the body bias implant wells per pump event. Therefore, the change rate of the bias voltages in case of adaption can be adjusted. The adjustment of the pump gain can be implemented as part of the digital controller.

As for example, if the body bias voltages are not settled in an initial phase after power-up of the integrated circuit, the pump gain can be set to a high value to achieve fast settling of the body bias voltages, such that the hardware performance monitor reaches its target performance. If the voltages are settled and only smaller variations, e.g. slowly varying temperature variations, have to be tracked by the control loop, the gain can be set to a small value, which results in less ripple of the bias voltages during circuit operation.

The charge pump unit transfers charge to or from the bias voltage nets without the need to control a target voltage, and without the need for a reference voltage generator (e.g. bandgap) a setpoint digital-to analog converter and a clock source or additional clock input signal, as known from the state of the art for charge pump devices. This has the advantage that chip size and power consumption of the charge pump device is significantly reduced.

In another embodiment of the inventive apparatus, the closed control loop is integrated within the integrated circuit. This means that the closed loop for generation and adaptive regulation is part of the integrated circuit. This has the advantages
- of a fast feed-back path of the closed loop regulation, which helps with stability of the regulation;
- that no components external to the integrated circuit are required;
- that all body bias voltage generation and regulation is completely self-contained in a dedicated part of the integrated circuit, which helps to simplify the construction of the remaining, usually much larger parts of that integrated circuit.

The objective of the invention will also be solved by a method for generating and adaptive regulating of body bias voltages of an integrated circuit that uses the apparatus mentioned above, the method comprising the following steps:
- monitoring a body bias voltage by a hardware performance monitor, counting a frequency of an oscillator of a hardware performance monitor by a counter, comparing the frequency of the oscillator with a frequency of a reference clock signal, and
- regulating the body bias voltage by a control unit which controls at least one charge pump.

It is possible to adjust the timing of the control loop, such that the timing of the charge pump(s) along with the amount of pumped charge and together with the characteristics of the parts of the integrated circuit connected to the body bias voltages determine the dominant pole of the control loop, whereas the remaining parts of the control loop, as for example the digital filter inside the controller, are adjusted so that the regulation, hence the control loop is stable. This has the advantage of simplified construction of the digital part of the closed control loop and of the freedom to adjust the timing of the digital parts of the closed control loop within a very wide range.

It is also possible to adjust the digital parts of the control loop, e.g. the digital filter, in such a way that the dominant pole of the control loop is determined thereof. This has the advantage that this embodiment can be used easily in the construction of diverse integrated circuits.

An essential advantage of the present method is that only one reference clock signal is necessary to regulate the body bias voltages in such a range that the target performance will be reached or fulfilled. No extra dedicated clock sources are required.

In an embodiment of the inventive method, a frequency of the reference clock signal is freely selectable within wide limits, covering but not limited to the important range from 32 kHz to 100 MHz.

In a further embodiment of the inventive method, a size of active body bias powered chip area is freely selectable. This means that the method and apparatus can be used for a wide range of chip size area.

Therefor a frequency multiplier, as for example a phase-locked-loop or delay locked loop is used to generate a defined higher frequency version of the reference clock frequency. Typically, the multiplication ratio is selectable as fractional value N/M. This has the advantage that the actual reference clock signal can be selected from a wide range but also allowing a defined operation frequency of the controller logic.

In another embodiment of the inventive method, the output clock signal generated by the oscillator of the hardware performance monitor is used to clock the counter, digital controller and the charge pump unit. This has the advantage that in case only a slow reference clock frequency is available (e.g. 32 kHz), a higher charge pump current and shorter digital control loop latency can be realized by using the performance monitor clock signal, which typically has a higher frequency than the reference clock source.

In another embodiment of the inventive method, a timing of the digital circuit affected by the control loop is controlled by a mechanism implemented in the control loop, whereas the mechanism comprises a frequency divider which adjusts the clock signal of the digital controller and the charge pumps of the charge pump unit dynamically, based on a lock condition of the closed loop. The frequency divider can be realized as separate circuit block or within a finite state machine control of the digital control logic. This has the advantage that the power consumption of the loop can be reduced if the closed loop has settled to its target value of the performance monitors, by reaching the associated values of the bias voltages.

In another embodiment of the inventive method, a lock state of the closed loop can be detected by comparing the current counter values of the monitor circuits with the reference values and detection the values match within a specified tolerance range. The loop gain of the closed loop control can be controlled based on this lock condition. Loop gain control can be realized by adapting the digital loop filter gain and/or the number of charge pumps of the charge pump unit and/or the clock frequency of the controller can be adjusted.

The invention will be explained in more detail using an exemplary embodiment.

BRIEF DESCRIPTION OF THE DRAWING FIGURES

The appended drawings show

FIG. 1 A block diagram of the inventive apparatus for generation and adaptive regulation of n-well and p-well body bias voltages in a closed loop;

FIG. 2 A block diagram of the hardware performance monitor circuit block, where the output signal of multiple hardware performance monitors can be selected by a multiplexer;

FIGS. 3a and 3b A block diagram of the control unit for generation of charge pump control signals from hardware performance monitor signals, where the digital parts are clocked a) with the multiplied reference clock signal b) with a hardware performance monitor signal;

FIG. 4 A block diagram of the charge pump circuit, consisting of four separated pumps for increasing and decreasing of the voltage value of the p-well and n-well body bias nets, respectively;

FIG. 5 The control flow for sequential read-out of the hardware performance monitor values and generation of the charge pump control signals.

DETAILED DESCRIPTION

FIG. 1 shows the inventive apparatus for generation and adaptive regulation of body bias voltages of an integrated circuit. The apparatus comprises a digital circuit 2, a control unit 4 and a charge pump unit 5, whereas the control unit 4 and the digital circuit 2 are connected via a closed control loop. The digital circuit 2 comprises at least one hardware performance monitor 6 for monitoring a timing the digital circuit 2 affected by a body bias voltage 7 connected to the n-well and p-well area of the transistor. The body bias voltage 7 which is connected to a p-well or n-well area underneath the classical nmos or pmos transistor area which can be seen as a fourth connection of said transistor in order to adjust an adaptive compromise between switching speed and leakage current consumption in order to be able to adapt the circuit or system with regard to the performance requirement. The control loop is formed by a control path comprising the at least one charge pump in the charge pump unit 5, the hardware performance monitor 6 and the control unit 4, whereas the charge pump is controllably connected to the control unit 4. The control unit 4 adjusts the charge pump for generation and adaptive regulation of the body bias voltage 7 according to a timing difference between an output signal 11 of the hardware performance monitor 6 and a reference clock signal 10.

The frequency of the reference clock signal 10 can be adjusted by a frequency multiplier circuit 13, which allows adaption to a wide range of reference clock signals 10.

The closed loop permits to adapt and maintain the body bias control voltages 7 in the necessary ranges without taking into account the actual value of the body bias voltages.

FIG. 2 shows the hardware performance monitor circuit 6, consisting of at least one ring-oscillator circuit 62 which monitors the timing of the digital logic in a body bias-controlled domain 20. The output signals of the ring oscillators 62 are selectable by a multiplexer 61. In an alternative realization separate ring-oscillator output signals can be fed to the output in parallel.

FIG. 3a shows the digital control unit 4 of the inventive apparatus. The hardware performance monitor signal 11 is fed to a counter 3 which counts the hardware performance monitor cycles within a timing window defined by the multiplied reference clock signal, thereby measuring the relative frequency of the hardware performance monitor signal 11 and the multiplied reference clock signal. The counter result is fed to a comparator 16 which compares it to a reference value, by calculating the difference. The comparator output is fed to a digital filter logic 17 with low-pass characteristics, which can be realized as filter with proportional and integral signal paths. The filter output is fed to a charge pump signal generator 18, which generates a sequence of switching pulses 19 for the charge pump unit 5. Depending on the sign of the filter output, charge pumps for increasing or decreasing the bias voltages can be enabled separately 51-54. For two different body-bias well voltages, separate instances of the filter and the control signal generators can be present. In an alternative realization, separate instances of the comparator can be present, when separated hardware performance monitor signals 11 are fed to the digital control unit 4 in parallel.

The control flow is controlled by a finite state machine (FSM) 15. The clock signal frequency of the filter logic within the control unit clock domain 20 can be controlled by a frequency divider 14, which allows to reduce the filter update rate and thereby its power consumption when the closed body bias loop is settled. The frequency divider 14 is controlled by the finite state machine 15.

FIG. 3b shows an alternative realization of the digital control unit 4 of the inventive apparatus, where the hardware performance monitor signal 11 is used to clock the control unit clock domain 20. Thereby it is possible to use the frequency of an oscillator signal of the hardware performance monitor 6 directly as performance monitor clock signal for the control unit 4 and the charge pumps 51-54 in the closed loop. This has the advantage that a higher filter and charge pump signal frequency in the control unit clock domain 20 can be achieved from a low frequency reference clock 10.

FIG. 4 shows the charge pump unit 5 of the inventive apparatus. It consists of charge pumps 51-54 which can transfer charge from or to a body bias voltage net to decrease or increase its voltage value 7, respectively. The charge pumps are switched by charge pump control signals 19, which is typically a sequence of clock signal edges fed to the charge pump unit 5 from the digital control unit 4. The advantage of the inventive apparatus is that the charge pump unit 5 does not contain a voltage reference generator since the target performance of the digital circuit 4 is regulated in a closed loop. It further does not contain a separated clock generator since it is clocked by the digital control unit 4 with clock sources from the reference clock of the hardware performance monitor signals 11.

FIG. 5 shows an example realization of the control flow of the inventive apparatus. First, a first hardware performance monitor circuit 6 is enabled and its output signal is counted. Then the hardware performance monitor circuit 6 is disabled again. The counter value is compared to the reference value and a lock condition is checked. Then the first digital filter is updated with the difference of the counter signal and the reference value. Then the first charge pump signal generator is enabled and the charge pump 5 for the first body bias net is run for a specified time. After this, the procedure is repeated for a second hardware performance monitor 6. Its output signal is counted and fed to the comparator 16. Then the second digital filter is updated with the difference of the counter signal and the reference value. Then the second charge pump signal generator is enabled and the charge pump for the second body bias net is run for a specified time.

In another embodiment of the inventive method, two hardware performance monitors 6 can operate simultaneously, where also the two filters and control signal generators operate in parallel. Thereby two control loops run in parallel.

In another embodiment of the inventive method, at least one hardware performance monitor 6 is operating continuously, generating the clock signal for the digital control logic.

An essential advantage of the present apparatus is that the required reference signals so far can be reduced to only one single reference clock signal 10, which is used to regulate the body bias voltages 7 in such a range that the target performance will be reached or fulfilled.

It is also advantageous that the closed loop can be implemented within the integrated circuit 2. This saves chip area and reduces the overall power consumption.

Summarizing, the inventive apparatus and method allow the complete transparency of generation and maintenance of body bias voltages. There is no external control required. The frequency of the reference clock signal as well as the size of the active body bias powered chip area can be freely selected in a wide range and wide limits.

LIST OF REFERENCE SIGNS 1 integrated circuit
2 digital circuit
3 counter
4 control unit
5 charge pump unit
51 charge pump slice VPW voltage decrease
52 charge pump slice VPW voltage increase
53 charge pump slice VNW voltage decrease
54 charge pump slice VNW voltage increase
6 hardware performance monitor
61 multiplexer selecting hardware performance monitor
62 ring oscillator
7 body bias voltage(s)
8 n-well voltage (VNW)
9 p-well voltage (VPW)
10 reference clock signal
11 output of hardware performance monitor
12 performance monitor clock signal
13 clock frequency multiplier
14 clock frequency divider
15 finite state machine controller
16 comparator
17 digital filter
18 charge pump control signal generator
19 charge pump control signals
20 control unit clock domain

The invention claimed is:

1. An apparatus for generation and adaptive regulation of body bias voltages of an integrated circuit comprising:
a digital circuit,
a counter,
a control unit,
a charge pump unit, and
wherein the control unit and the digital circuit are connected in a closed control loop, and
wherein the digital circuit comprises at least one hardware performance monitor to monitor a timing of the digital circuit affected by a body bias voltage, and
wherein the control loop is formed by a control path comprising the charge pump unit, the hardware performance monitor and the control unit, and
wherein the charge pump unit is controllably connected to the control unit to adjust the charge pump for generation and adaptive regulation of the body bias voltage according to a frequency difference between an output signal of the hardware performance monitor and a reference clock signal.

2. The apparatus according to claim 1, wherein the charge pump unit comprises four charge pumps for generating two active body bias voltages, one charge pump for respectively increasing or decreasing one of the two said active body bias voltages.

3. The apparatus according to claim 1, wherein the charge pump unit comprises a single-stage charge pump for increasing and a single-stage charge pump for decreasing the body bias voltage within a working range with predominantly positive voltage; and a single-stage charge pump for increasing and a two-stage charge pump for decreasing the body bias voltage within a working range with predominantly negative voltage.

4. The apparatus according to claim 3, wherein the hardware performance monitor indicates a required adaption of the body bias voltage towards an optimum value for a target performance of the integrated circuit.

5. The apparatus according to claim 4, wherein the hardware performance monitor comprises at least one oscillator.

6. The apparatus according to claim 5, wherein the reference clock signal is connected to a frequency multiplier circuit generating a higher frequency version of the frequency of the reference clock signal and to an output signal of the hardware performance monitor.

7. The apparatus according to claim 6, wherein a gain of the closed control loop is changeable by changing the operation frequency of the charge pump unit by means of a programmable frequency divider and/or by changing a number of charge pumps within the charge pump unit.

8. The apparatus according to claim 1, wherein the control unit is a digital controller.

9. The apparatus according to claim 1, wherein the hardware performance monitor indicates a required adaption of the body bias voltage towards an optimum value for a target performance of the integrated circuit.

10. The apparatus according to claim 1, wherein the hardware performance monitor comprises at least one oscillator.

11. The apparatus according to claim 10, wherein the frequency of an oscillator signal of the hardware performance monitor is usable as a clock signal for a control unit clock domain and the charge pump unit.

12. The apparatus according to claim 1, wherein the counter is connected to the output of the hardware performance monitor and a reference clock signal source.

13. The apparatus according to claim 1, wherein the reference clock signal is connected to a frequency multiplier circuit generating a higher frequency version of the frequency of the reference clock signal and to an output signal of the hardware performance monitor.

14. The apparatus according to claim 1, wherein a gain of the closed control loop is changeable by changing the operation frequency of the charge pump unit by means of a programmable frequency divider and/or by changing a number of charge pumps within the charge pump unit.

15. The apparatus according to claim 1, wherein the closed control loop is integrated within the integrated circuit.

16. A method for generating and adaptive regulating of body bias voltages of an integrated circuit using the apparatus according to claim 1, the method comprising the following steps:

monitoring the body bias voltage by the hardware performance monitor, counting a frequency of an oscillator of the hardware performance monitor by the counter, comparing the frequency of the oscillator with a frequency of the reference clock signal, and regulating the body bias voltage by the control unit which controls at least one charge pump.

17. The method according to claim 16, wherein the frequency of the reference clock signal is freely selectable by a frequency multiplier.

18. The method according to claim 16, wherein a size of an active body bias powered chip area is freely selectable.

19. The method according to claim 16, wherein a timing of a digital circuit affected by the closed control loop is controlled by a mechanism implemented in the closed control loop, wherein the mechanism comprises a frequency divider which adjusts a clock frequency of a digital controller and charge pumps of the at least one charge pumps, dynamically based on a lock condition of the closed control loop.

20. The method according to claim 19, wherein the lock condition of the closed control loop is detected by comparing a counting value of the frequency of the oscillator of the hardware performance monitor with a reference counting value of a frequency of the reference clock signal and detecting if the counting valve of the frequency of the oscillator and the reference counting valve values match within a specified tolerance range.

\* \* \* \* \*